United States Patent [19]

Reneau, Jr.

[11] Patent Number: 5,139,667
[45] Date of Patent: Aug. 18, 1992

[54] NUTSCHE PROCESS FILTER DRIVE UNIT

[75] Inventor: James T. Reneau, Jr., Willis, Tex.

[73] Assignee: Sparkler Filters, Inc., Conroe, Tex.

[21] Appl. No.: 823,252

[22] Filed: Jan. 21, 1992

Related U.S. Application Data

[60] Division of Ser. No. 749,143, Aug. 23, 1991, which is a continuation of Ser. No. 569,940, Aug. 17, 1990, abandoned, which is a continuation of Ser. No. 286,959, Dec. 20, 1988, abandoned.

[51] Int. Cl.$^5$ ............................ B01F 7/00; B03B 5/36
[52] U.S. Cl. .................... 210/319; 366/286; 366/289
[58] Field of Search ............ 366/285, 286, 289, 193, 366/332, 333, 334, 78; 74/22 R, 22 A; 210/319, 738

[56] References Cited

U.S. PATENT DOCUMENTS

| | | | |
|---|---|---|---|
| 2,540,474 | 2/1951 | Cox | 210/319 |
| 3,355,153 | 11/1967 | Nolte | 366/286 |
| 4,074,362 | 2/1978 | Kruder | 366/289 |
| 4,163,723 | 8/1979 | Romano | 210/319 |
| 4,290,701 | 9/1981 | Schad | 366/78 |
| 4,824,255 | 4/1989 | Wohlrab | 366/289 |

Primary Examiner—Robert W. Jenkins
Attorney, Agent, or Firm—Arnold, White & Durkee

[57] ABSTRACT

A drive unit for a nutsche filter which includes a drive shaft assembly and an impeller shaft assembly which rotate together but which telescope relative to one another. Moving parts of the overall drive shaft assembly are enclosed for protection from corrosion and wear problems. The drive unit is supported above a filter vessel and enters the vessel through a sealed opening.

11 Claims, 4 Drawing Sheets

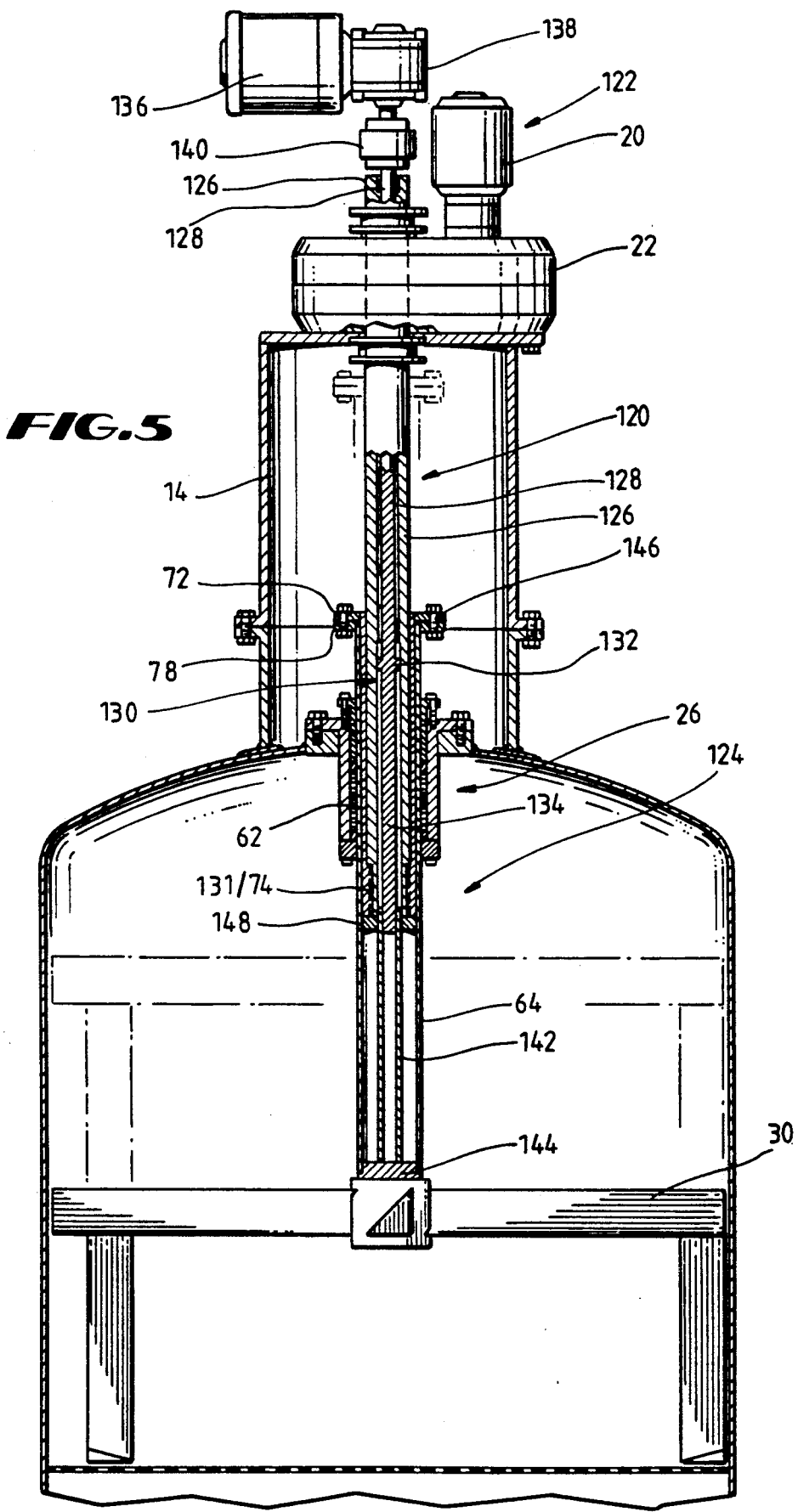

NUTSCHE PROCESS FILTER DRIVE UNIT

This application is a divisional application of application Ser. No. 07/749,143, filed Aug. 23, 1991, which is a continuation application of application Ser. No. 07/569,940, filed Aug. 17, 1990, now abandoned which is a continuation application of application Ser. No. 07/286,959, filed Dec. 20, 1988, now abandoned.

BACKGROUND OF THE INVENTION

1. Field of the Invention

The invention relates to a drive unit for a nutsche process filter. More specifically, the invention relates to drive units that make such filters more compact and subject to less wear.

2. Background

Nutsche filters are used to react, wash, dry, separate, filter and otherwise process liquid solutions. Such processing may cause the formation of cakes. The Nutsche filters are capable of stirring, shaving, discharging or smoothing ("processing") the cakes.

Some Nutsche filters operate by lowering a turning impeller into the filter vessel containing the liquid solution. In prior art systems, the impeller shaft is typically driven by a reversible motor where rotational motion is translated from the motor through a gear arrangement to the shaft.

In operation, the impeller is lowered into and lifted out of the liquid solution by hydraulic arms. Typically, the arms are connected to the top of the shaft by a yoke. The hydraulic arms, motor and gear arrangement comprise the nutsche filter drive system. The drive system is capable of operating the nutsche filter. However, there are some drawbacks.

Existing nutsche filter drives require that either the motor and gear drive or drive shaft be raised from their lowest position above the filter vessel in order to raise the impeller shaft and impellers which are contained within the vessel. The present invention eliminates having to raise the drive shaft, gear drive or motor from their fixed positions above the filter. Thus, the drive components become stationary items.

Another drawback involves the height of the nutsche filter. Many nutsche filters stand over 15 feet high. The drive unit is disposed on top of the vessel and space must be allowed for travel of the motor and speed reducer or shaft when raising the impeller. The vertical space required for operation may make it difficult, if not impossible, to operate in many buildings. Furthermore, the shaft may be exposed to dirt and corrosion when lifting the impeller.

The problems identified with the present nutsche filter drive system are meant to be illustrative and are not exhaustive. Rather, this discussion is intended to show potential areas of improvement.

SUMMARY OF INVENTION

In general, the present invention comprises a nutsche filter unit in which the upper end of the drive shaft assembly is fixed vertically, and the drive unit components are protected from the environment. The drive unit comprises a telescoping drive shaft assembly that raises and lowers the impeller without vertical movement of the upper end of the drive shaft assembly. The drive unit is capable of varying the speed or direction of the impeller during vertical movement of the impeller.

The compact nature of the drive unit enables it to be sealed from the environment and lubricated. This lubrication reduces shaft and seal wear.

In a broad aspect, the present invention comprises a drive system for a nutsche filter that includes a telescoping shaft attachable at its lower end to an impeller. The upper end of the shaft is coupled to a suitable power source. The shaft assembly includes an upper drive shaft section or assembly and a lower impeller shaft section or assembly that rotate together but which move vertically relative to one another. A spline arrangement positioned between the two shaft sections provides for both types of movement.

A power transmission system working through the hollow portion of the shaft operates to move the impeller shaft section vertically. The power transmission system may be either hydraulic or mechanical, but is preferably hydraulic. In the hydraulic embodiment a reversible hydraulic fluid circuit is provided in the hollow drive shaft section which conveys hydraulic fluid up and down the drive shaft to effect vertical movement of the impeller shaft. The up and down flow occurs in two separate flow paths established in the drive shaft.

Structurally, the present invention preferably comprises a hydraulic powered drive unit for a nutsche filter. This drive unit includes a hydraulic motor, speed reducer, shaft, guide assembly and drive shaft assembly.

The drive unit is disposed on, in and below a drive housing that is disposed on top of the filter vessel. The motor is rotatively coupled to the speed reducer, and preferably both of these components are disposed on top of the drive housing.

The guide assembly is disposed in the vessel below the drive housing. The guide assembly is adapted to receive the drive shaft assembly.

The drive shaft assembly is connected at one end to the speed reducer. The drive shaft assembly includes the drive shaft, a top flange, a sleeve and the impeller shaft.

The drive shaft is coupled to the speed reducer and disposed inside the drive housing. In a preferred embodiment of the invention, the drive shaft includes a 2-stage bore, at least one horizontal passageway and external splines. A tube is disposed inside the bore to separate the stages. A hydraulic coupling is disposed on top of the shaft to provide fluid communication from a hydraulic pump and reservoir to the shaft bore through the different stages.

The top flange is disposed around the shaft and includes a shoulder and neck. An O-ring or other suitable seal is disposed between the top flange neck and shaft to ensure proper sealing.

The sleeve is disposed around the shaft, adjacent to and below the top flange. The sleeve includes internal splines that engage the external splines of the drive shaft.

The impeller shaft is disposed around the sleeve and is slideable through the guide assembly. The impeller shaft is connected to the sleeve and top flange at or near the top of the impeller shaft. A first packing or other suitable seal is disposed between the guide assembly and the impeller shaft to ensure proper sealing. A second packing or other suitable seal is also disposed between the drive shaft and the internal diameter of the impeller shaft to ensure proper sealing between the drive shaft and the impeller shaft.

The above, preferred form of the present invention operates with the impeller in its "up" position as follows. The motor is actuated to impart rotational motion to the drive shaft through the speed reducer. Hydraulic fluid is pumped through the coupling and tube and out the bottom of the shaft. The fluid fills the space between the bottom of the second packing and the bottom of the hollow impeller shaft. That action lowers the impeller within the filter vessel.

When processing is completed, the impeller is raised. Raising the impeller shaft is accomplished by directing hydraulic fluid through the drive shaft bore around the out side of the tube and through a lateral passageway into the space between the impeller and drive shafts and above the second packing. Pumping fluid into that space causes the impeller to raise.

The present invention provides several features not found in the prior art. For instance, the sleeve and the impeller shaft travel along the drive shaft, where the overall shaft assembly is enclosed. That arrangement:

(1) reduces the vertical space required for operation of the filter;

(2) protects the moving parts from wear and exposure to dirt and corrosion; and (3) eliminates vertical movement of the drive shaft, motor or drive mechanism.

The filter may be driven rotationally by a single hydraulic motor. Preferably the motor is mounted on top of the housing. The motor and speed reducer are both commercially available from a number of manufacturers. This arrangement provides several advantages including ease of repair, availability and convenience.

Vertical movement of the impeller shaft relative to the drive shaft may also be accomplished by a threaded screw or any other suitable mechanical arrangement.

The features and advantages identified are meant to be illustrative not exhaustive. Additional features and advantages will become evident to those of ordinary skill in the art when reviewing the drawings in view of detailed description of the preferred embodiments.

BRIEF DESCRIPTION OF THE DRAWINGS

FIG. 5 is a partial, cross sectional view of the filter having a screw actuated drive unit.

DESCRIPTION OF THE PREFERRED EMBODIMENT

Figure 1:
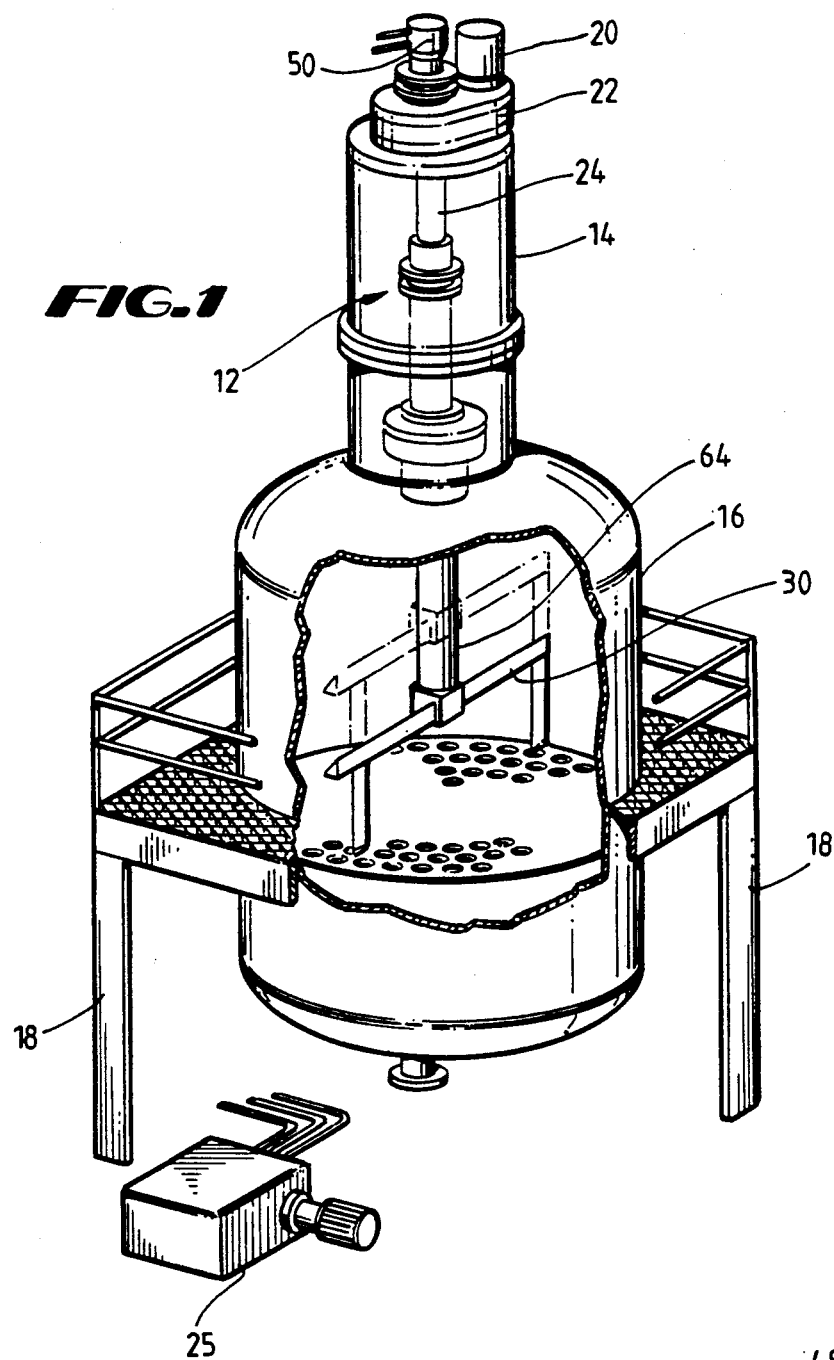
FIG. 1 is a perspective, partially cutaway view of a nutsche filter incorporating the invention.
Figure 4:
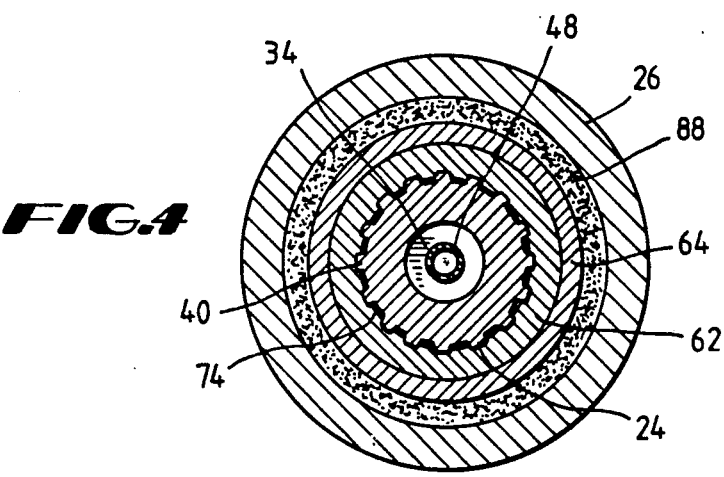
FIG. 4 is a cross sectional view along line 4-4 in FIG. 3.
Figure 2:
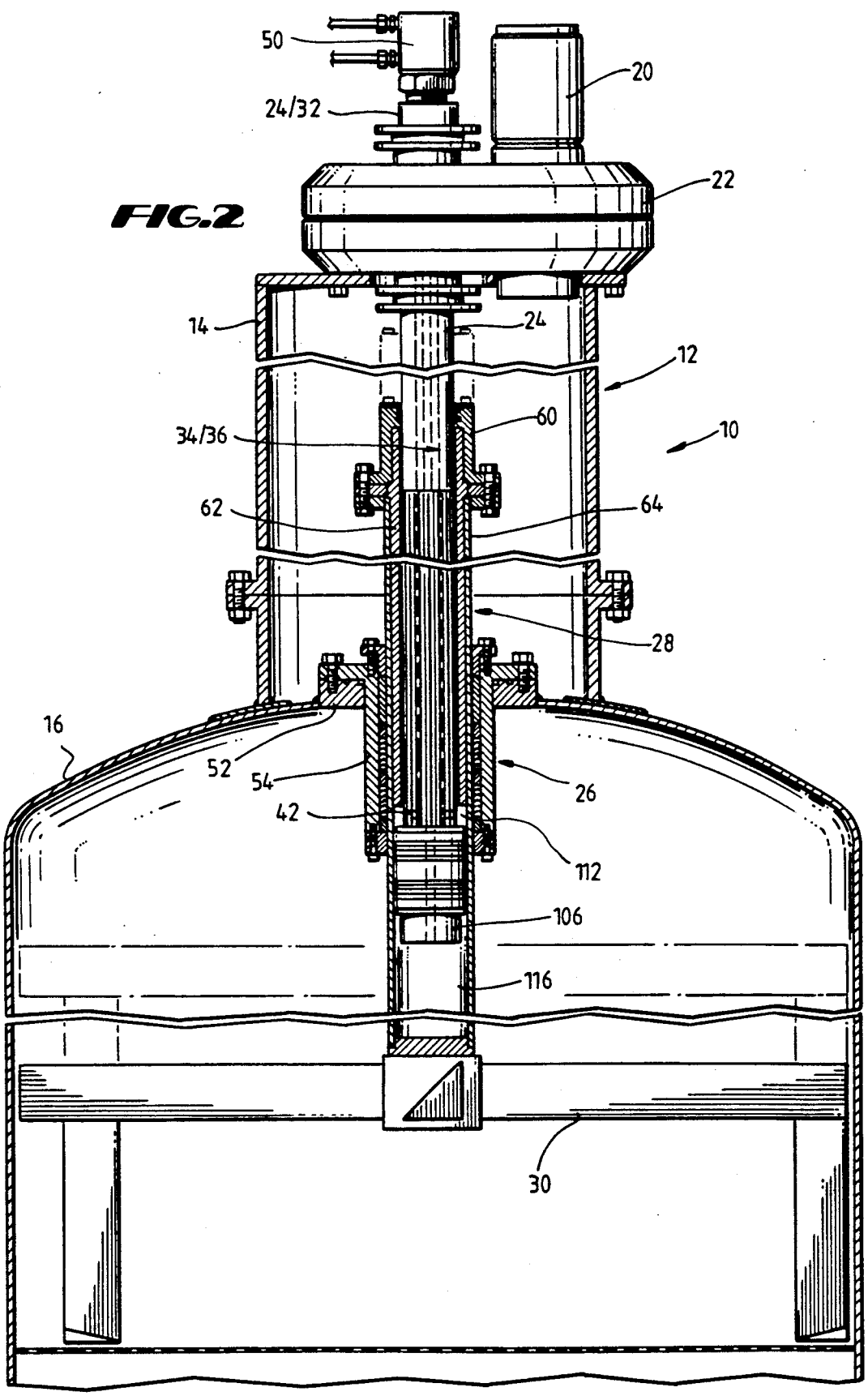
FIG. 2 is a cross sectional view of the filter of the preferred embodiment with the impeller in the down position.
Figure 3:
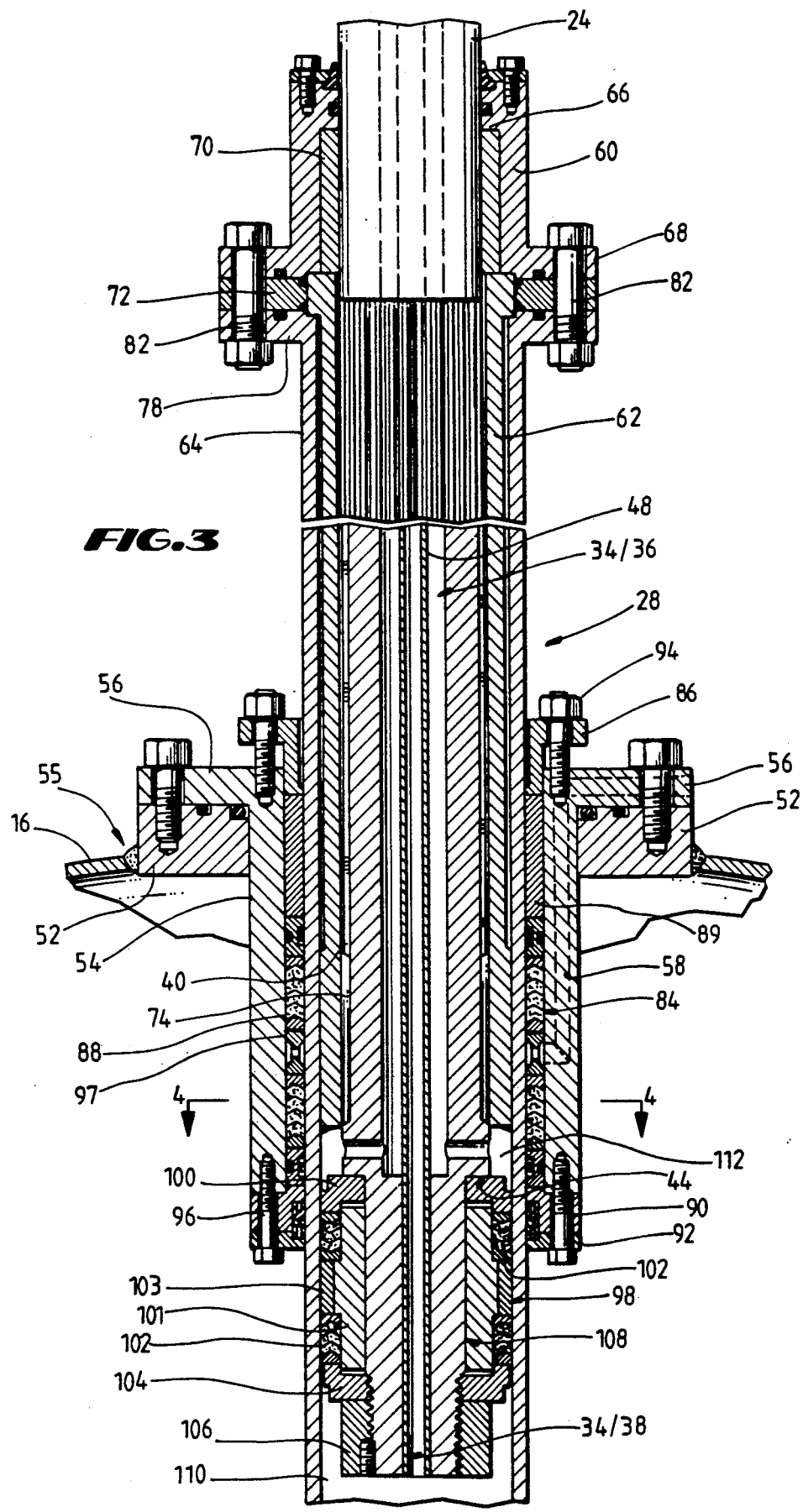
FIG. 3 is an enlarged partial cross sectional view of a portion of the filter emphasizing the relationship between the drive shaft and the impeller shaft.

A nutsche process filter 10 of the present invention is shown in FIG. 1. Filter 10 includes a drive unit 12, housing 14, vessel 16 and legs 18. A preferred embodiment incorporating a hydraulic drive is shown in FIGS. 2-4. A second embodiment of the invention incorporating a screw-actuated impeller lift mechanism is shown in FIG. 5.

Hydraulic Drive

Drive unit 12 is disposed partially on top of and inside housing 14, and partially inside the vessel 16. Drive unit 12 comprises a motor 20, speed reducer 22, shaft 24, guide assembly 26, drive shaft assembly 28 and impeller 30.

Motor 20 and speed reducer 22 are disposed on top of the housing 14. Preferably, motor 20 is hydraulic; however, electrical, mechanical or other drive means are also acceptable. Speed reducer 2 is rotatively coupled to motor 20.

Drive shaft 24 is rotatively coupled to speed reducer 22 and is in fluid communication with a separate hydraulic power source 25 (See FIG. 1). Drive shaft 24 includes a top 32, a bore 34 having an upper stage 36 and a lower stage 38, at least one spline 40, at least one passageway 42, a shoulder 44 and threads 46.

A tube 48 is disposed inside the two-stage bore where tube 48 isolates upper stage 36 from the lower stage 38. A rotary union or coupling 50 is disposed on top 32 of shaft 24 in fluid communication with bore 34.

Guide assembly 26 is disposed on top and inside of vessel 16 and adapted to receive drive shaft assembly 28. Guide assembly 26 includes ring 52 and flange 54. Ring 52 is disposed in an opening 55 in the top of vessel 16. Flange 54 is disposed inside and on top of ring 52. Flange 54 includes a shoulder 56 and passageway 58 and is secured to ring 52.

Impeller shaft assembly 28 is slideably disposed around drive shaft 24 and through guide assembly 26. Impeller shaft assembly 28 includes a top flange 60, sleeve 62 and impeller shaft 64. Top flange 60 includes neck 66 and shoulder 68.

Top flange 60 is disposed around shaft 24 where neck 66 is disposed next to shaft 24 in sliding relation. Bushing 70 is disposed between the remaining portion of top flange 60 and shaft 24.

Sleeve 62 is disposed around shaft 24 beneath top flange 60. Sleeve 62 includes shoulder 72 and internal splines 74. Internal splines 74 of sleeve 62 slideably engage splines 40 of drive shaft 24.

Impeller shaft 64 is disposed around sleeve 62 and through guide assembly 26. A shoulder 78 is disposed around the top of impeller shaft 64. The impeller 30 is connected to the bottom of impeller shaft 64. The bottom of impeller shaft 64 is sealed.

Shoulder 72 of sleeve 62 is disposed between shoulder 68 of top flange 60 and shoulder 78 of impeller shaft 64. Those three components are connected to each other by a fastening means 82, preferably a nut and bolt arrangement.

A first packing assembly 84 is disposed between guide assembly 26 and impeller shaft 64. Packing assembly 84 includes a compression flange 86, packing 88, bushing 89 bottom flange 90 and sealing ring 92. Compression flange 86 is connected to the guide flange 54 by fastening means 94, preferably bolts. The sealing ring 92 and bottom flange 90 are connected to the guide flange 54 by a fastening means 96, preferably bolts. Packing 88 is disposed between the compression flange 86 and bottom flange 90. Preferably packing 88 includes a lantern ring 97 for fluid and pressure relief.

A second packing assembly 98 is disposed between impeller shaft 64 and the bottom portion of drive shaft 24. The packing assembly 98 includes upper locating ring 100, spacing ring 101, packing 102, bushing 103, lower locating ring 104 and nut 106. Upper locating ring 100 is disposed against a shoulder 44 in drive shaft 24. Packing 102 is disposed between upper locating ring 100 and lower locating ring 104. Nut 106 is threaded on drive shaft 24 to hold the packing assembly 98 in place.

Drive unit 12 operates as follows. Motor 20 is actuated and engages speed reducer 22 to impart rotational motion into drive shaft 24. As shaft 24 rotates, fluid may be pumped by a power source 25 through tube 48 into a space 110 between second packing assembly 98 and the bottom of impeller shaft 64. As space 110 is filled, the fluid pushes on the bottom of impeller shaft 64. That forces the impeller shaft 64 to slide on drive shaft 24, lowering the impeller 30.

When processing is complete, the impeller 30 is raised. Impeller 30 is raised by feeding hydraulic fluid outside tube 48 and through upper stage 36 of bore 34. The fluid travels through passageway 42 into the space 112 between packing assembly 98 and an 0-ring or other suitable seal in top flange 60, forcing the impeller shaft 64 to rise on drive shaft 24.

Significant to the invention, as shown in FIGS. 1-4 is the ability of the sleeve 62 to slide along the drive shaft 24 independent of rotary movement of impeller shaft 64 with drive shaft 24. These independent motions of the impeller shaft 64 are especially helpful when conducting filtration in a nutsche filter.

Screw Drive

A second embodiment of the inventive drive unit 12 is shown in FIG. 5. The screw actuated drive unit 12 comprises a two piece shaft 120, motor assembly 122, a guide assembly 26, a threaded impeller drive shaft assembly 124 and the impeller 30. This embodiment is generally similar to the embodiment of FIGS. 1-4. The principal differences include the two piece shaft 120, motor assembly 122 and drive shaft assembly 124. The remainder of the drive unit 12 is substantially the same as the preferred first embodiment of FIGS. 1-4.

Two piece drive shaft assembly 120 includes drive shaft 126 and threaded shaft 128. Drive shaft 126 includes bore 130 and external splines 131. Threaded shaft 128 is rotateably disposed in bore 130 of drive shaft shaft 126, where shafts 126 and 128 may rotate independently of one another. Threaded shaft 128 includes a collar 132 and threaded section 134.

Motor assembly 122 is disposed on top of housing 14 and includes the motor 20 and speed reducer 22, a threaded shaft motor 136, gear reducer 138 and clutch 140. Threaded shaft motor 136 is rotateably coupled with gear reducer 138 which is rotateably coupled to clutch 140.

Drive shaft 126 is rotateably coupled with speed reducer 22 in the same fashion as drive shaft 24. Threaded shaft 128 is rotateably coupled to, and is held in a fixed vertical position by clutch 140.

Impeller shaft assembly 124 is slideably disposed around drive shaft 126 and through guide assembly 26. Impeller shaft assembly 124 includes sleeve 62, impeller shaft 64, drive shaft assembly 120, and a stroke tube 142.

Sleeve 62 is disposed around drive shaft 126. Sleeve 62 includes a shoulder 72 and internal splines 74. Internal splines 74 slidably engage splines 131 of drive shaft 126.

Impeller shaft 64 is disposed around sleeve 62 and through guide assembly 26. Impeller shaft 64 includes shoulder 78 and base plate 144. Base plate 144 seals the bottom of impeller shaft 64. The bottom of shoulder 72 of sleeve 62 is connected to the top of shoulder 78 of impeller shaft 64 by suitable fastening means 146.

A bushing 148 is connected to the bottom of drive shaft 126 and is adapted to receive threaded stroke tube 142.

Threaded stroke tube 142 is connected at one end to the base plate 144, and the other end extends through bushing 148. Stroke tube 142 includes internal threads adapted to receive the threaded portion 134 of threaded shaft 128.

This embodiment operates in the same fashion as the first preferred embodiment but for the manner of vertical displacement of the impeller shaft. The vertical displacement of the impeller shaft in this embodiment operates as follows. The threaded shaft motor 136 is actuated. Clutch 140 engages and rotates threaded shaft 128. As the shaft 128 rotates, it unthreads the stroke tube 142 causing the impeller shaft 64 to lower. Clutch 140 is disengaged or adjusted to slip when the impeller 30 reaches the desired depth in the filter.

The impeller 30 is raised by first reversing the threaded shaft motor 136. Clutch 140 then engages the threaded shaft 128 which now threads into the stroke tube 142. The clutch 140 is disengaged or adjusted to slip when the impeller 30 reaches its desired height.

The description of the preferred embodiments was meant to be illustrative not exhaustive of the invention. Rather the description provides an enabling description of the best mode of the invention.

What is claimed is:

1. A nutsche filter comprising:
   (a) an enclosed filter vessel including a laterally disposed filter plate, an opening in the top, and a drain in the bottom;
   (b) an impeller and tubular impeller shaft assembly, said impeller being laterally disposed within the filter vessel above said plate, said tubular impeller shaft attached at its lower end to the impeller and extending up through the opening in the vessel in rotatable and axially slideable, sealed relation;
   (c) a hollow drive shaft mounted within the tubular impeller shaft in co-rotatable and axially slideable relation;
   (d) a first power drive transmission coupled to the drive shaft and operable to rotate said drive shaft about its longitudinal axis; and
   (e) a reversible second power drive transmission capable of being coupled to the impeller shaft through the hollow drive shaft and operable to move the impeller shaft axially relative to the hollow drive shaft.

2. The filter of claim 1 wherein the second power transmission comprises a hydraulic power drive.

3. The filter of claim 2 where the hydraulic Dower drive further comprises two fluid conduits within the hollow drive shaft, one said conduit adapted to apply hydraulic power to the impeller shaft assembly to move the impeller shaft axially in a first direction, and a second said conduit adapted to apply hydraulic power to the impeller shaft assembly to move the impeller shaft axially in a direction opposite to the first direction.

4. The filter of claim 1 wherein the second power transmission comprises a mechanical power transmission.

5. The filter of claim 4 where the mechanical power transmission further comprises a screw adapted to be coupled to a reversible mechanical power drive and in threaded engagement with the impeller and impeller shaft assembly to enable said assembly to move axially relative to said screw.

6. The filter of claim 1 which further comprises a spline connection interposed between the drive shaft and the impeller shaft.

7. A drive unit for a housed nutsche filter including a filter vessel, comprising:
   (a) a motor disposed on top of the filter housing;

(b) a speed reducer rotatively coupled to the motor;
(c) a drive shaft rotatively coupled to the speed reducer comprising;
  (i) at least one longitudinal spline;
  (ii) a two stage bore in which an upper stage is greater in diameter that a lower stage;;
  (iii) at least one passageway penetrating the wall of the upper stage;
  (iv) a shoulder; and
  (v) threads disposed at the bottom of the shaft;
(d) an impeller shaft assembly disposed around the drive shaft;
(e) the impeller shaft assembly comprises;
  (i) a top flange disposed around the drive shaft in arc axially slideable, sealed relation;
  (ii) a sleeve disposed around the drive shaft attached to the top flange at its upper end and having at least one internal spline at the other end engageable with the splined drive shaft; and
  (iii) a hollow impeller shaft disposed around the sleeve having a top end attachable with the sleeve to the upper flange;
(f) a guide flange connected to the vessel and disposed around the impeller shaft in sliding and rotatable relation, said guide flange adapted to close an opening in the nutsche filter for the impeller shaft, and;
(g) a packing assembly disposed around the drive shaft below said passageway and adapted to seal the annular space between the drive shaft and the impeller shaft below the sleeve;
(i) a third packing disposed between the shaft below the shoulder and the impeller shaft;
(j) a nut threaded on threads of the shaft.

8. A drive shaft assembly for installation in the housing of a nutsche filter, comprising:
(a) a hollow impeller shaft closed at its lower end and adapted to penetrate the housing of a nutsche filter in a sliding, and not rotational relation, and further adapted at said lower end to be attached to an impeller;
(b) a flange attached to the second, upper end of the impeller shaft;
(c) a cylindrical, hollow race within the impeller shaft and attached to said flange at a first, upper end of the race;
(d) a set of longitudinal splines positioned around and within the second, lower end of the hollow race;
(e) a hollow drive shaft first, disposed within the race in rotatable relation with a first, upper end of said drive shaft adapted to be attached to a power source capable of rotating the drive shaft, said drive shaft further adapted to pass through said flange in a sealed relation, and;
(f) a set of longitudinal splines positioned around said first end of said drive shaft to mate with the set of splines on the race, one of said sets being longer than the other set.

9. The drive shaft assembly of claim 8 in which the longer splines are on the drive shaft.

10. The drive shaft of claim 9, further comprising:
(a) a bushing mounted around the lower end of the drive shaft below the lower end of the race and adapted to fit within the impeller shaft in a sliding relation;
(b) a threaded shaft disposed within the hollow drive shaft in rotatable relation to define an annular space with said drive shaft; and
(c) a tubular member internally threaded at its upper end to mate with the threaded shaft and to screw axially within said annular space, the lower end of said tubular member attached to the closed lower end of the impeller shaft.

11. The drive shaft assembly of claim 8 in which the hollow portion of the drive shaft defines an upper sage of relatively large diameter and a lower stage of relatively small diameter positioned below said passageway, and said drive shaft assembly further comprises a tube extending down the two stages and sized to fit closely within said lower stage and to define an annular space in the upper stage so as to separate the two stages.

* * * * *

UNITED STATES PATENT AND TRADEMARK OFFICE
CERTIFICATE OF CORRECTION

PATENT NO. : 5,139,667
DATED : August 18, 1992
INVENTOR(S) : James T. Reneau, Jr.

It is certified that error appears in the above-indentified patent and that said Letters Patent is hereby corrected as shown below:

Column 8, line 2, claim 8, change "sage" to -- stage --.

Signed and Sealed this

Fourteenth Day of September, 1993

*Attest:*

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,139, 667
DATED : August 18, 1992
INVENTOR(S) : James T. Reneau

It is certified that error appears in the above-indentified patent and that said Letters Patent is hereby corrected as shown below:

In claim 8, column 7, line 39, please delete "not".

Signed and Sealed this

Sixteenth Day of January, 1996

Attest:

BRUCE LEHMAN

*Attesting Officer*     *Commissioner of Patents and Trademarks*